United States Patent
Castelain et al.

(10) Patent No.: US 9,036,726 B2
(45) Date of Patent: May 19, 2015

(54) METHOD AND A DEVICE FOR INCREASING THE AMOUNT OF INFORMATION BITS COMPRISED IN A SYMBOL

(71) Applicant: Mitsubishi Electric Corporation, Chiyoda-ku (JP)

(72) Inventors: Damien Castelain, Rennes Cedex (FR); Cristina Ciochina, Rennes Cedex (FR)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/381,799

(22) PCT Filed: Feb. 25, 2013

(86) PCT No.: PCT/EP2013/053737
§ 371 (c)(1),
(2) Date: Aug. 28, 2014

(87) PCT Pub. No.: WO2013/127749
PCT Pub. Date: Sep. 6, 2013

(65) Prior Publication Data
US 2015/0063477 A1    Mar. 5, 2015

(30) Foreign Application Priority Data
Feb. 29, 2012  (EP) ..................... 12157556

(51) Int. Cl.
*H04K 1/10* (2006.01)
*H04L 27/26* (2006.01)
*H04L 1/00* (2006.01)

(52) U.S. Cl.
CPC .......... *H04L 27/2613* (2013.01); *H04L 1/0083* (2013.01); *H04L 27/2663* (2013.01)

(58) Field of Classification Search
None
See application file for complete search history.

(56) References Cited

U.S. PATENT DOCUMENTS

| 2003/0063685 A1* | 4/2003 | Yoshida | 375/295 |
| 2010/0034165 A1* | 2/2010 | Han et al. | 370/330 |

(Continued)

FOREIGN PATENT DOCUMENTS

| EP | 2 219 335 A1 | 8/2010 |
| WO | WO 2010/047787 A2 | 4/2010 |

OTHER PUBLICATIONS

International Search Report issued Apr. 18, 2013, in PCT/EP13/053737 filed Feb. 25, 2013.

(Continued)

*Primary Examiner* — Adolf Dsouza
(74) *Attorney, Agent, or Firm* — Oblon, McClelland, Maier & Neustadt, L.L.P.

(57) ABSTRACT

A method for increasing the amount of information bits comprised in a symbol transferred by a source to at least one receiver. The symbol is representative of a modulated base sequence obtained by encoding a sequence of base bits selected by the source and by modulating the encoded selected sequence. The modulated base sequence has fixed points. The source encodes the selected sequence of base bits and a sequence of supplementary bits, obtains a modulated base sequence by modulating the encoded selected sequence of base bits, obtains a modulated altering sequence by modulating the sequence of supplementary bits, alters the modulated base sequence by modifying at least a part of the values of its fixed points using the modulated altering sequence in order to obtain a modulated altered sequence, and transfers the modulated altered sequence under the form of an altered symbol.

14 Claims, 7 Drawing Sheets

(56) References Cited

U.S. PATENT DOCUMENTS

| | | |
|---|---|---|
| 2010/0091907 A1 | 4/2010 | Noh et al. |
| 2011/0044406 A1 | 2/2011 | Insenser Farre et al. |
| 2011/0194625 A1 | 8/2011 | Hou-Shin et al. |

OTHER PUBLICATIONS

Written Opinion of the International Searching Authority issued Apr. 18, 2013, in PCT/EP13/053737 filed Feb. 25, 2013.

* cited by examiner

METHOD AND A DEVICE FOR INCREASING THE AMOUNT OF INFORMATION BITS COMPRISED IN A SYMBOL

The present invention relates generally to a method and a device for increasing the amount of information bits comprised in a symbol transferred by a source to at least one receiver.

In Digital Video Broadcasting standard, a synchronization symbol is used for identifying the preamble of each frame, for performing time and frequency synchronization and for conveying signalling data. The capacity of that synchronization symbols is of seven bits contained in two fields.

In DVB-T2 for example, for the generation of the synchronization symbol, the seven bits of information are error-correcting encoded to form a three hundred eighty four bits sequence.

In the future evolutions of DVB, supplementary parameters such as for example MIMO modes need to be introduced.

There is not today any possibility to add further information in synchronization symbol without modifying the number of resources used by the symbol.

The present invention aims at providing a method and a device which enable to add supplementary information in a symbol without modifying the number of resources used by the symbol.

To that end, the present invention concerns a method for increasing the amount of information bits comprised in a symbol transferred by a source to at least one receiver, the symbol being representative of a modulated base sequence obtained by encoding a sequence of base bits selected by the source among a plurality of possible sequences of base bits and by modulating the encoded selected sequence, each of the possible modulated base sequences that can be obtained from the possible sequences of base bits having fixed points, a fixed point having a same predetermined position within each modulated base sequence and having the same value within each modulated base sequence, characterized in that the method comprises the steps of:

encoding the selected sequence of base bits using an error correction code, encoding a sequence of supplementary bits using an error correcting code, obtaining a modulated base sequence by modulating the encoded selected sequence of base bits, obtaining a modulated altering sequence by modulating the sequence of supplementary bits, the modulated altering sequence having a length inferior or equal to the number of fixed points of the modulated base sequence, altering the modulated base sequence by modifying at least a part of the values of its fixed points using the modulated altering sequence in order to obtain a modulated altered sequence, transferring the modulated altered sequence under the form of an altered symbol.

The present invention also concerns a device for increasing the amount of information bits comprised in a symbol transferred by a source to at least one receiver, the symbol being representative of a modulated base sequence obtained by encoding a sequence of base bits selected by the source among a plurality of possible sequences of base bits and by modulating the encoded selected sequence, each of the possible modulated base sequences that can be obtained from the possible sequences of base bits having fixed points, a fixed point having a same predetermined position within each modulated base sequence and having the same value within each modulated base sequence, characterized in that the device for increasing the amount of information bits comprises:

means for encoding the selected sequence of base bits using an error correction code, means for encoding a sequence of supplementary bits using an error correcting code, means for obtaining a modulated base sequence by modulating the encoded selected sequence of base bits, means for obtaining a modulated altering sequence by modulating the sequence of supplementary bits, the modulated altering sequence having a length inferior or equal to the number of fixed points of the modulated base sequence, means for altering the modulated base sequence by modifying at least a part of the values of its fixed points using the modulated altering sequence in order to obtain a modulated altered sequence, means for transferring the modulated altered sequence under the form of an altered symbol.

Thus, further information is added in the synchronization symbol without modifying the number of resources used by the symbol.

According to a particular feature, the modulation is a differential modulation.

Thus, there is no need of performing channel estimation at the receiver side.

According to a particular feature, the source, prior to the transfer of the altered symbol, scrambles the modulated altered sequence.

Thus, the symbol is more robust to channel variations.

According to a particular feature, the altered symbol is an Orthogonal frequency Division Multiplexing symbol and the modulated altered sequence is transferred onto the subcarriers of the Orthogonal frequency Division Multiplexing altered symbol.

Thus, robust OFDM transmission can be used.

According to a particular feature, the altered symbol is a synchronization symbol.

Thus, the capacity of a synchronization symbol can be increased without modifying the number of resources used by the symbol.

According to a particular feature, the altered symbol is a Time Division Multiplex symbol or frame and the modulated altered sequence is transferred onto timeslots of a Time Division Multiplex transmission scheme.

Thus, classical TDM transmission can be used.

According to a particular feature, the modulated base sequence is altered by multiplying at least a part of the values of its fixed points by the modulated altering sequence.

Thus, simple altering at the transmitter side and simple correction at the receiver side can be used.

According to still another aspect, the present invention concerns a method for retrieving a sequence of base bits and a sequence of supplementary bits, the sequence of supplementary bits being used to alter a modulated base sequence in order to form an altered symbol transferred by a source, the modulated base sequence being obtained by encoding a sequence of base bits selected by the source among a plurality of possible sequences of base bits and by modulating the encoded selected sequence of base bits, each modulated base sequence of the plurality of possible modulated base sequences that can be obtained from the possible sequences of base bits having fixed points, a fixed point having a same predetermined position within each modulated base sequence and having the same value within each modulated base sequence, characterized in that the method comprises the steps of:

receiving the altered symbol and retrieving a received modulated altered sequence, processing at least a part of the values of the received modulated altered sequence at positions corresponding to fixed points of the modulated base sequence in order to obtain new values, determining, at least from the new values, the sequence of base bits and the sequence of supplementary bits.

The present invention concerns also a device for retrieving a sequence of base bits and a sequence of supplementary bits, the sequence of supplementary bits being used to alter a modulated base sequence in order to form an altered symbol transferred by a source, the modulated base sequence being obtained by encoding a sequence of base bits selected by the source among a plurality of possible sequences of base bits and by modulating the encoded selected sequence of base bits, each modulated base sequence of the plurality of possible modulated base sequences that can be obtained from the possible sequences of base bits having fixed points, a fixed point having a same predetermined position within each modulated base sequence and having the same value in each modulated base sequence, characterized in that the device for retrieving the sequence of base bits comprises:

means for receiving the altered symbol and retrieving a received modulated altered sequence, means for processing at least a part of the values of the received modulated altered sequence at positions corresponding to fixed points of the modulated base sequence in order to obtain new values, means for determining, at least from the new values, the sequence of base bits and the sequence of supplementary bits.

Thus, altered symbols with extended capacity can be decoded to retrieve the base bits and the supplementary bits.

According to a particular feature, for each possible modulated altering sequence:

new values are obtained from the modulated altering sequence and from the at least a part of the values of the received modulated altered sequence at positions corresponding to fixed points, an associated cost function value and an associated sequence of base bits are determined from the new values and other values of the received modulated altered sequence, and the sequence of base bits and the supplementary sequence are determined by selecting the sequence of base bits and the sequence of supplementary bits which are associated to the maximum determined cost function value.

Thus, joint detection of the base bits and of the supplementary bits can be performed.

According to a particular feature, temporary values are obtained from the at least a part of the values of the received modulated altered sequence at positions corresponding to fixed points of the modulated base sequence and from values of those corresponding fixed points of the modulated base sequence, the sequence of supplementary bits is determined from the temporary values, new values are obtained from the modulated altering sequence corresponding to the determined supplementary bits and from the at least a part of the values of the received modulated altered sequence at positions corresponding to fixed points of the modulated base sequence, the base bits are determined from the new values and other values of the received modulated altered sequence.

Thus, suboptimal but less complex detection can be performed by retrieving first the supplementary bits and then the base bits.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatuses according to the invention, they will not be repeated here.

The characteristics of the invention will emerge more clearly from a reading of the following description of an example of embodiment, the said description being produced with reference to the accompanying drawings, among which.

The present invention will be disclosed in an example wherein OFDM scheme is used. The present invention is also applicable in other schemes as disclosed hereinafter.

Figure 1:
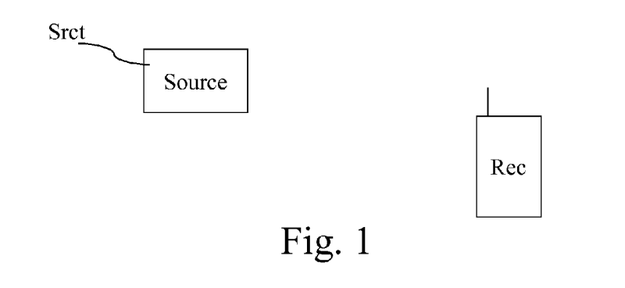
FIG. 1 represents a telecommunication network in which the present invention is implemented.

The telecommunication network is for example a telecommunication network in which at least one source Srct transfers or broadcasts signals within an area in which at least one receiver Rec is located.

The source Srct is for example a terrestrial station or a satellite which broadcasts signals complying with DVB (Digital Video Broadcast) standards.

The telecommunication network is for example a cellular telecommunication network, in which a base station transfers signals to a mobile terminal or broadcasts signals to at least two mobile terminals.

The source Srct may be a mobile terminal which transfers signals to a base station.

The receiver Rec may be a mobile terminal to which data like video signals are broadcasted or a mobile terminal which is in communication with a remote telecommunication device like a mobile phone or with a server or a base station or a home base station which receives signals from the mobile terminal.

Only one source Srct is shown in the FIG. 1 for the sake of simplicity, but the network may comprise a more important number of sources Srct.

Only one receiver Rec is shown in the FIG. 1 for the sake of simplicity, but signals may be transferred or broadcasted to a more important number of receivers Rec.

The signals broadcasted by the source Srcs may be OFDM symbols, for example compatible with DVB-NGH (Digital Video Broadcasting Next Generation Handheld) broadcasting norm.

The present invention will be disclosed in an example wherein signals are OFDM (Orthogonal Frequency Division Multiplexing) symbols. The present invention is also applicable when signals are transferred or broadcasted using Time Division Multiplex scheme as it will be disclosed hereinafter.

In DVB for example, in the standard ETSI EN 302755 v1.2.1 (2010-10), "Digital Video Broadcasting (DVB); Frame structure channel coding and modulation for a second generation DVB system (DVB-T2)" some particular synchronization exists.

A synchronization symbol noted P1 is formed by appending prefix/postfix to an OFDM symbol containing one thousand twenty four subcarriers. Out of the one thousand twenty four subcarriers, eight hundred fifty three subcarriers in the middle of the band are useful subcarriers, the rest being guard subcarriers.

Out of the eight hundred fifty three useful subcarriers, only three hundred eighty four are used, they are named active subcarriers, leaving the others named unused subcarriers set to zero.

The source Srct generates the P1 synchronization symbol using p=7 base bits of information included in a field S which are error-correcting encoded to form a three hundred eighty four bits sequence.

The field S is composed of two fields, S1 and S2 containing three and respectively four bits. The error correcting code is transferred under the form of a complementary sequence set (CSS) which is made by two patterns CSS1 and CSS2. CSS1 patterns encode S1 based on eight orthogonal sets of eight complementary sequences of length eight. The total length of each CSSS1 pattern is then sixty four, while the CSS2 patterns encode S2 based on sixteen orthogonal sets of sixteen complementary sequences of length sixteen. The total length of each CSS2 pattern is then two hundred fifty six.

The sequence b corresponding to S=[S1 S2] is built as b=[CSS1 CSS2 CSS1] and has hence a length of three hundred eighty four. This binary sequence b can be transposed into a corresponding +1/−1 codeword d.

d is modulated using, for example, Differential Binary Phase Shift Keying (DBPSK) to obtain x=MSS_DIFF and then scrambled to obtain $x_{SCR}$=MSS_SCR composed of three hundred eighty four symbols to be mapped onto the three hundred eighty four active subcarriers. In this particular case all the codewords d start with the same value, in this example equal to one. Since no supplementary sequence initiating symbol is needed, d and x have the same size. In other cases, the length of the codeword d may be inferior by one to the length of the differentially modulated sequence x.

It has to be noted here that other kinds of modulations, which are not necessary differential, may be used in the present invention.

Among the three hundred eighty four symbols of the modulated base sequence x, one hundred twenty eight of them have fixed values. These one hundred twenty eight values are given in FIG. 2.

According to the invention, the source Srct increases the amount of information bits comprised in a symbol transferred by a source to at least one receiver, the symbol being representative of a modulated base sequence obtained by encoding a sequence of base bits selected by the source Srct among a plurality of possible sequences of base bits and by modulating the encoded selected sequence, each of the possible modulated base sequences that can be obtained from the possible sequences of base bits having fixed points, a fixed point having a same predetermined position within each modulated base sequence and having the same value within each modulated base sequence. The source Srct:

encodes the selected sequence of base bits using an error correction code, encodes a sequence of supplementary bits using an error correcting code, obtains a modulated base sequence by modulating the encoded selected sequence of base bits, obtains a modulated altering sequence by modulating the sequence of supplementary bits, the modulated altering sequence having a length inferior or equal to the number of fixed points of the modulated base sequence, alters the modulated base sequence by modifying at least a part of the values of its fixed points using the modulated altering sequence in order to obtain a modulated altered sequence, transfers the modulated altered sequence under the form of an altered symbol.

According to the invention, the receiver Rec retrieves a sequence of base bits and a sequence of supplementary bits, the sequence of supplementary bits being used to alter a modulated base sequence in order to form an altered symbol transferred by a source Srct, the modulated base sequence being obtained by encoding a sequence of base bits selected by the source among a plurality of possible sequences of base bits and by modulating the encoded selected sequence of base bits, each modulated base sequence of the plurality of possible modulated base sequences that can be obtained from the possible sequences of base bits having fixed points, a fixed point having a same predetermined position within each modulated base sequence and having the same value within each modulated base sequence. the receiver Rec:

receives the altered symbol and retrieving a received modulated altered sequence, processes at least a part of the values of the received modulated altered sequence at positions corresponding to fixed points of the modulated base sequence in order to obtain new values, determines, at least from the new values, the sequence of base bits and the sequence of supplementary bits.

Figure 2:
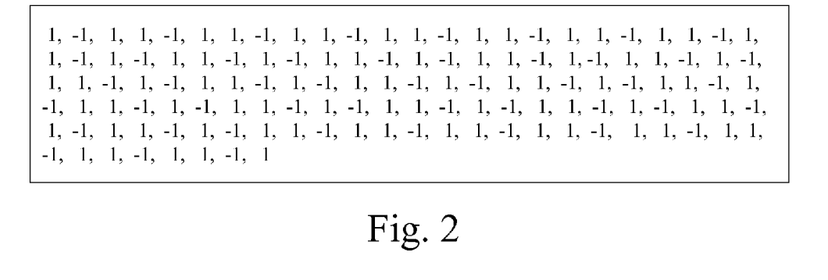
FIG. 2 discloses the value of each fixed point of a modulated base sequence used for the construction of a synchronization symbol P1 transferred by a source.

FIG. 2 discloses the value of each fixed point of a modulated base sequence used for the construction of a synchronization symbol P1 transferred by a source.

Figure 3:
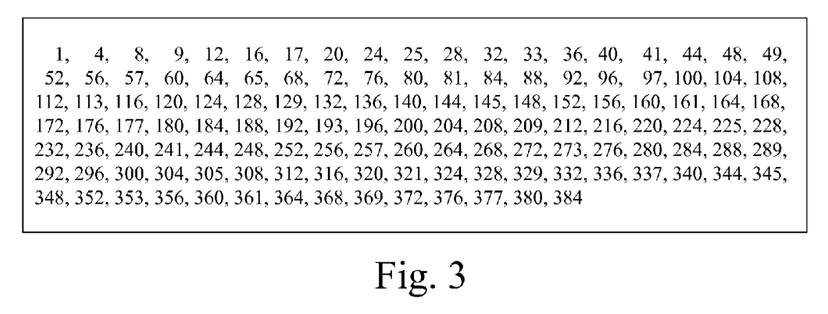
FIG. 3 discloses an example of a set of indexes of the active subcarriers, within the set of three hundred eighty four active subcarriers, onto which fixed points of a modulated base sequence are mapped by a source.

These values are constant for all possible P1 sequences and they are mapped on subcarriers having the indexes which are given in FIG. 3.

FIG. 3 discloses an example of a set of indexes of the active subcarriers, within the set of three hundred eighty four active subcarriers, onto which fixed points of a modulated base sequence are mapped by a source.

The indexes of the active subcarriers on which fixed points of the symbol P1 are mapped are named index_fixed(i) and have the values indicated in FIG. 3. The numbering of these indexes is understood as starting with one.

Figure 4:
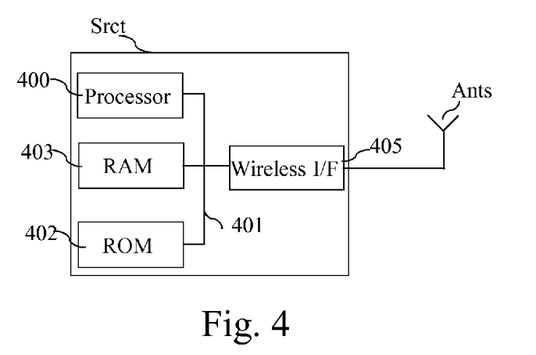
FIG. 4 is a diagram representing the architecture of a source.

FIG. 4 is a diagram representing the architecture of a source.

The source Srct has, for example, an architecture based on components connected together by a bus 401 and a processor 400 controlled by programs.

It has to be noted here that the source Srct may have an architecture based on dedicated integrated circuits.

The bus 401 links the processor 400 to a read only memory ROM 402, a random access memory RAM 403 and a wireless interface 405.

Figure 8:
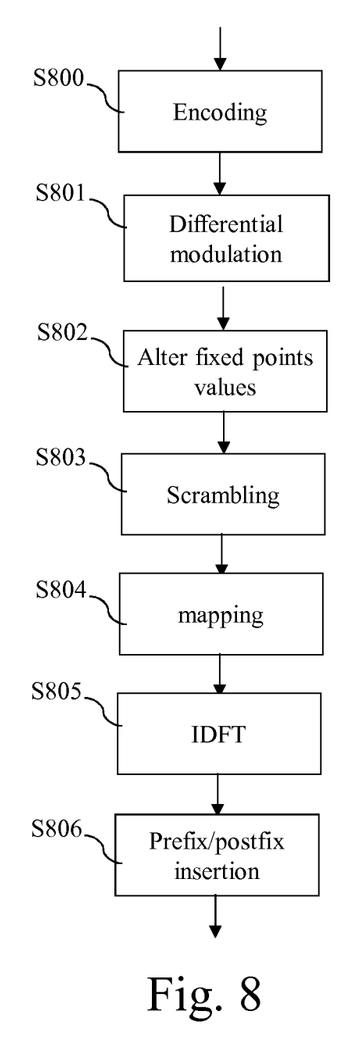
FIG. 8 discloses an example of an algorithm executed by the source according to the present invention.

The memory 403 contains registers intended to receive variables and the instructions of the program as disclosed in FIG. 8.

The processor 400 controls the operation of the wireless interface 405.

The read only memory 402 contains instructions of the program as disclosed in FIG. 8 which are transferred, when the source Srct is activated, to the random access memory 403.

The wireless interface 405 comprises means for transferring symbols according to the invention.

The wireless interface 405 is connected to an antenna Ants used for transferring or broadcasting signals according to the present invention.

Figure 5:
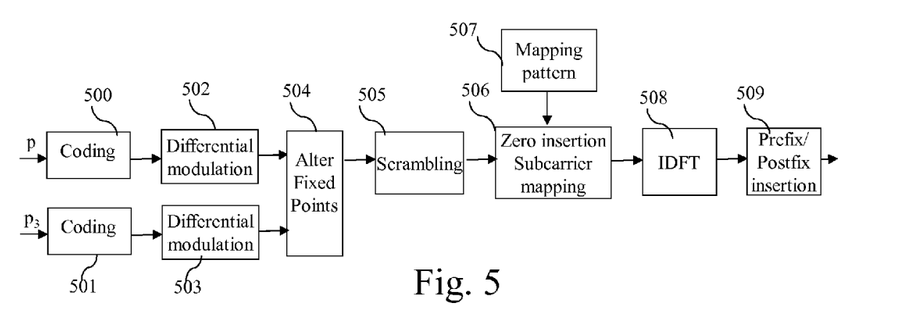
FIG. 5 discloses a block diagram of components of a wireless interface of the source according to the present invention.

The wireless interface 405 comprises components as disclosed in FIG. 5.

FIG. 5 discloses a block diagram of components of a wireless interface of the source according to the present invention.

The wireless interface 405 of the source Srct comprises an error correcting coding module 500 which encodes the p base bits conveyed by the P1 symbol using an error correction code.

The output of the error correcting module 500 is transposed to a binary +1/−1 sequence forming a codeword d out of a set of base codewords and provided to a differential modulation module 502 which modulates it. The modulation may be DBPSK, DQPSK, DAPSK, DPSK or any other differential or not differential modulation. The resulting M-length modulated base sequence x is fed to a fixed point alteration module 504.

The wireless interface of the source Srct comprises an error correcting coding module 501 which encodes the $p_3$ supplementary bits using an error correction code.

The output of the error correcting module 501 is transposed to a binary +1/−1 sequence forming a codeword d' out of a set of supplementary codewords and provided to a differential modulation module 503 which modulates it. The modulation may be DBPSK, DQPSK, DAPSK, DPSK or any other differential or not differential modulation. The resulting modulated altering sequence z is fed to the fixed point alteration module 504.

The length $p_3$ of the supplementary sequence of bits is chosen such as the modulated altering sequence z has a length inferior or equal to the number of fixed points of the modulated base sequence x. The set of codewords used to encode the $p_3$ supplementary bits can be issued from any type of error correcting code of rate $p_3$/length(d').

The fixed point alteration module 504 alters part or all of the fixed points of the modulated base sequence x according to the modulated altering sequence z.

For example, the fixed point alteration module 504 multiplies the values of at least a part of the fixed points of x by the elements of the sequence z.

In a particular case, the modulated altering sequence z has a length equal to the number of fixed points of the modulated base sequence x and the fixed point alteration module 504 multiplies all the fixed points of the modulated base sequence x by the elements of the altering sequence z. Multiplication is understood element by element of the sequences.

Let us denote by $z^k$ the k-th modulated altering sequence of the set of $2^{p_3}$ modulated altering sequences used to represent the $p_3$ supplementary bits.

The present invention associates the l-th modulated altered sequence $x'^l$ to the transmission of the $p'=p+p_3$ bits of information composed by p base bits represented by the modulated base sequence $x^n$ and the $p_3$ supplementary bits represented by the modulated altering sequence $z^k$. In a particular example, we can assume $l=(n-1)\cdot 2^{p_3}+k$.

To obtain the new modulated altered sequence, in case where all fixed points values are altered, the fixed point alteration module 504 proceeds as follows:

for all the fp indexes index_fixed(i), i=1 ... fp $$x'^l_{index\_fixed(i)} = x^n_{index\_fixed(i)} \cdot z^k_i, i=1\ldots fp$$

for all the M-fp remaining indexes $j \in \{1 \ldots M\}$\index_fixed, $$x'^l_j = x^n_j, j \in \{1\ldots M\}\backslash\text{index\_fixed (i.e., } j \notin \text{index\_fixed)}$$

The resulting sequence $x'^l$ can be optionally scrambled by a scrambling module 505. This scrambled sequence is mapped onto the M active subcarriers by the zero insertion and mapping module 506 following a given subcarrier mapping pattern provided by a mapping pattern module 507.

After N-point Inverse Discrete Fourier Transform executed by an IDFT module 508, a prefix and/or suffix can be inserted prior to transmission by a prefix/posfix insertion module 509.

Figure 6:
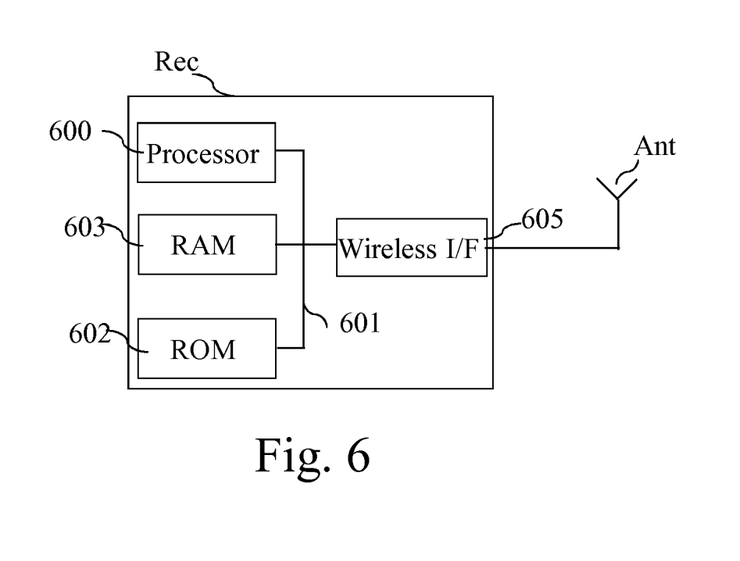
FIG. 6 is a diagram representing the architecture of a receiver in which the present invention is implemented.

FIG. 6 is a diagram representing the architecture of a receiver in which the present invention is implemented.

Figure 9:
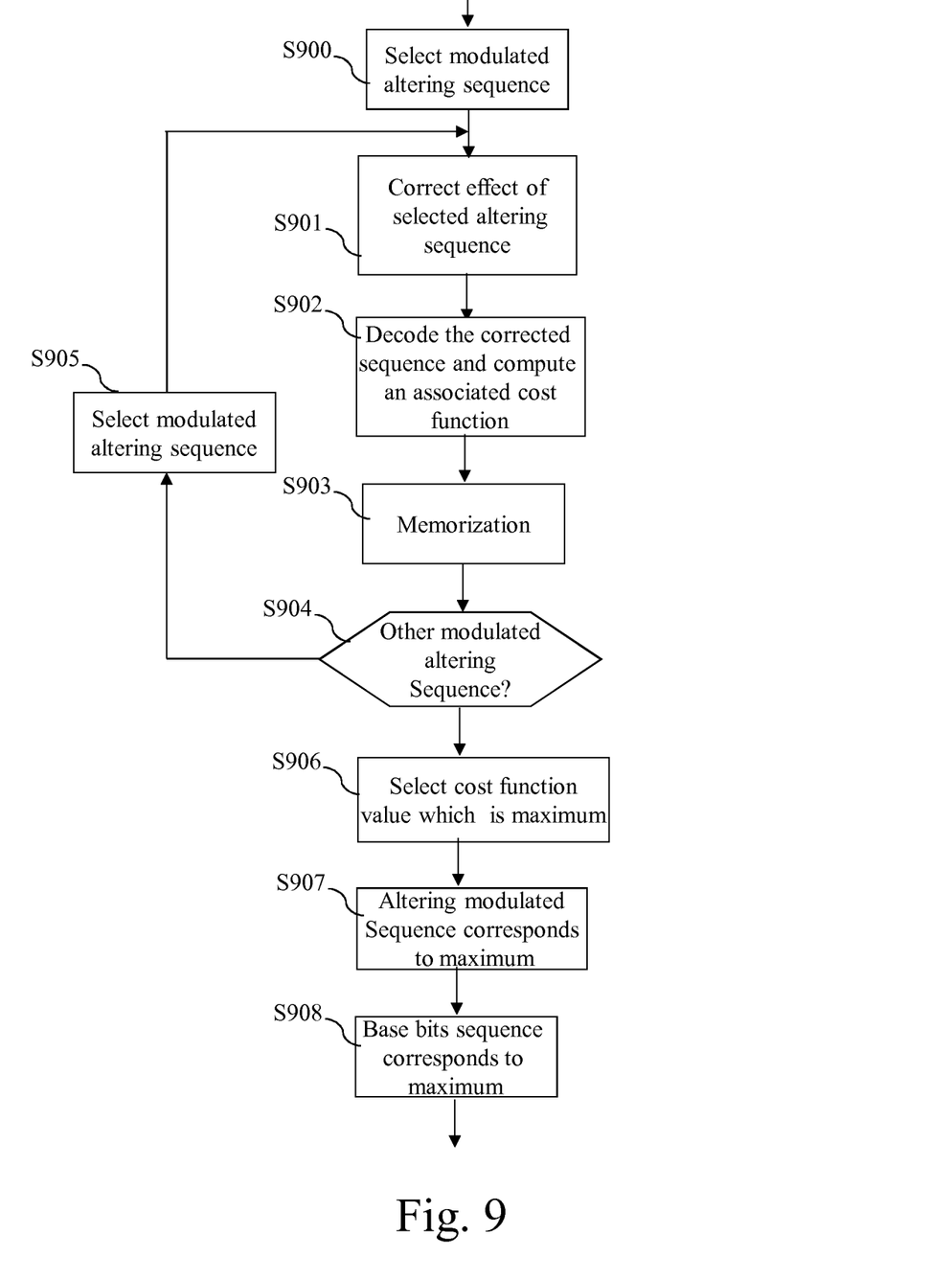
FIG. 9 discloses an example of an algorithm executed by the receiver according to a first mode of realization of the present invention.
Figure 10:
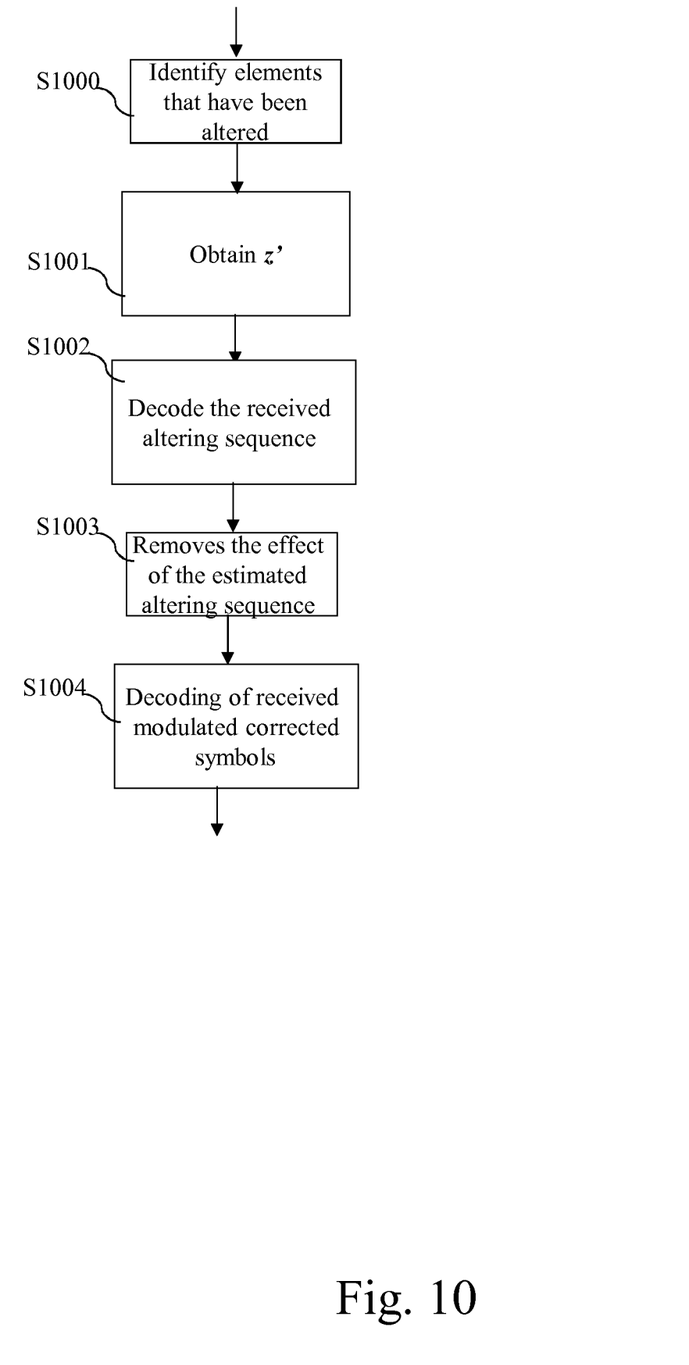
FIG. 10 discloses an example of an algorithm executed by the receiver according to a second mode of realization of the present invention.

The receiver Rec has, for example, an architecture based on components connected together by a bus 601 and a processor 600 controlled by the program as disclosed in FIG. 9 or 10.

It has to be noted here that the receiver Rec may have an architecture based on dedicated integrated circuits.

The bus 601 links the processor 600 to a read only memory ROM 602, a random access memory RAM 603 and a wireless interface 605.

The memory 603 contains registers intended to receive variables and the instructions of the program related to the algorithm as disclosed in FIG. 9 or 10.

The processor 600 controls the operation of the wireless interface 605.

The read only memory 602 contains instructions of the program related to the algorithm as disclosed in FIG. 9 or 10, which are transferred, when the receiver Rec is activated, to the random access memory 603.

The wireless interface 605 comprises means for receiving radio signals transferred or broadcasted by the source Srct.

The wireless interface 605 is connected to at least one antenna Ant used for receiving radio signals transferred or broadcasted by the source Srct.

Figure 7:
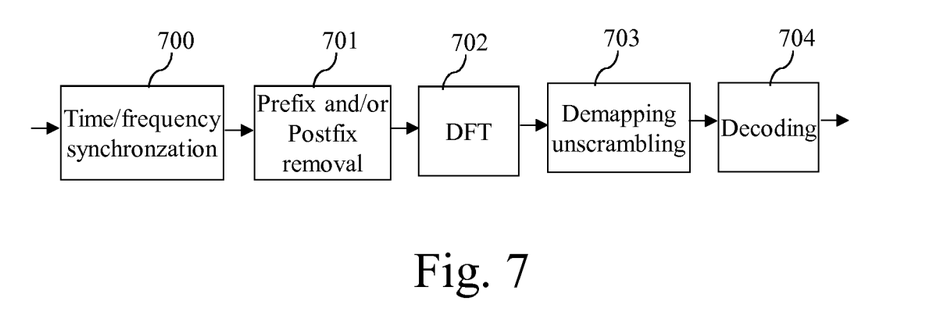
FIG. 7 discloses a block diagram of components of a wireless interface of the receiver.

The wireless interface 605 comprises components as disclosed in FIG. 7.

FIG. 7 discloses a block diagram of components of a wireless interface of the receiver.

The wireless interface 605 of the receiver Rec comprises a time and frequency synchronization module 700 which performs synchronization.

It has to be noted here that the synchronization may introduce time and/or frequency errors as it will be disclosed hereinafter in reference to FIG. 11.

The wireless interface 605 of the receiver Rec comprises a prefix and/or postfix removal module 701 which removes the prefix and/or suffix of the synchronized received symbols.

The wireless interface 605 of the receiver Rec comprises a DFT module 702 which performs a Discrete Fourier Transform on the received symbols on which the prefix and/or suffix are removed.

The wireless interface 605 of the receiver Rec comprises a sub-carrier demapping and unscrambling module 703 which demaps the output of the DFT module 702 by removing the guard subcarriers and unused subcarriers to obtain the active subcarriers, and then removes the eventual scrambling.

The subcarrier demapping and unscrambling module 703 retrieves thus the M elements of the received modulated and altered sequence y transferred onto the active subcarriers following a given subcarrier mapping pattern. When differential modulation is employed, the subcarrier demapping and unscrambling module 703 retrieves a sequence of received differentially modulated altered symbols.

The wireless interface 605 of the receiver Rec comprises a decoding module 704 which decodes the output of the demapping and unscrambling module 703.

According to the invention, the decoding module 705 executes the algorithm as disclosed in FIG. 9 or 10.

FIG. 8 discloses an example of an algorithm executed by the source according to the present invention.

More precisely, the present algorithm is executed by the processor 400 of the Source Srct.

At step S800, the processor 400 commands the wireless interface 405 of the source Srct in order to obtain a codeword d by encoding the p base bits using an error correction code and to obtain a supplementary codeword d' by encoding $p_3$ supplementary bits using an error correction code that may be different from the one used to encode the p base bits.

The $p_3$ supplementary bits convey supplementary information with respect to the one conveyed by the p base bits. These information are for example, parameters related to Multiple Input Multiple Output abilities or other system parameters, for example cyclic prefix length or DFT size of the following data frames, parameters relative to extensions of existing telecommunication standards or other system information.

At next step S801, the processor 400 commands the wireless interface 405 in order to modulate the encoded base bits and the encoded supplementary bits.

For example a differential modulation is performed. The modulation may be DBPSK, DQPSK, DAPSK, DPSK or any other differential or not differential modulation.

The modulated base bits sequence is a M-length sequence noted x and the modulated altering sequence is an altering sequence noted z, whose length is inferior or equal to the number of fixed points of the modulated base sequence x.

The set of codewords used to encode the $p_3$ supplementary bits can be issued from any type of error correcting code of rate $p_3$/length(d').

At next step S802, the processor 400 commands the wireless interface 405 in order to alter the value of at least a part of the fixed points of the modulated base sequence x according to the altering sequence z.

Altering can be made, for example, by multiplying at least a part of the values of the fixed points of the modulated base sequence x by the elements of the altering sequence z. Other types of sequence altering can be employed in some cases, like a summation, a puncturing, etc. . . .

For example, if hundred twenty eight fixed points exist, at most fp=128 fixed points of the modulated base sequence x are multiplied by the elements of the altering sequence z.

More particularly, in the present example, all the fp=128 fixed points of the modulated base sequence x are multiplied by the elements of the altering sequence z.

As already disclosed, to obtain the new modulated altered sequence, the fixed point alteration module 504 proceeds as follows:

for all the fp indexes index_fixed(i), i=1 . . . fp $$x'_{index\_fixed(i)}{}^{l} = x_{index\_fixed(i)}{}^{n} \cdot z_i^k, i=1 \ldots fp$$

for all the M-fp remaining indexes j∈{1 . . . M} \index_fixed, $$x'_j{}^{l} = x_j{}^{n}, j \in \{1 \ldots M\} \backslash \text{index\_fixed (i.e., } j \notin \text{index\_fixed)}$$

It has to be noted here that in this particular example the altering sequence z is composed of fp elements. When the altering sequence z has less than fp elements, only a subset of length(z) points out of the fp fixed points of the sequence x is altered.

At next step S803, the processor 400 commands the wireless interface 405 in order to scramble the resulting sequence $x^{tl}$.

It has to be noted here that in a variant, the step S803 is not executed, the processor 400 moves from step S802 to S804.

At next step S804, the processor 400 commands the wireless interface 405 in order to map the resulting sequence $x^{tl}$ following a given subcarrier mapping pattern.

At next step S805, the processor 400 commands the wireless interface 405 in order to perform a N-point Inverse Discrete Fourier Transform.

At next step S806, the processor 400 commands the wireless interface 405 in order to insert a prefix and/or suffix prior to transmission.

FIG. 9 discloses an example of an algorithm executed by the receiver according to a first mode of realization of the present invention.

More precisely, the present algorithm is executed by the processor 600 of the receiver Rec.

The present algorithm, for each possible modulated altering sequence:
  obtains new values from the modulated altering sequence and from the at least a part of the values of the received modulated altered sequence at positions corresponding to fixed points,
  determines an associated cost function value and an associated sequence of base bits from the new values and other values of the received modulated altered sequence,
  and the sequence of base bits and the supplementary sequence are determined by selecting the sequence of base bits and the sequence of supplementary bits which are associated to the maximum determined cost function value.

At step S900, the processor 600 selects one possible modulated altering sequence $z^m$ among the set $z^1$ to $z^{2^{p_3}}$ of modulated altering sequences that could be used by the source Srct for altering the modulated base sequence x.

The set of modulated altering sequences that could be used by the source Srct for altering the modulated base sequence is for example stored in the RAM memory 603.

At next step S901, the processor 600 commands the wireless interface 405 in order to correct the effect of the altering sequence.

For example, when altering was made by multiplication of the fixed points of the modulated base sequence x with the modulated altering sequence z, the processor 600 commands the wireless interface 405 in order to divide values mapped on subcarriers of FIG. 3 by the selected modulated altering sequence zm.

The received modulated corrected sequence $y'''$ can be obtained by correcting the fp samples of the received modulated altered sequence y indicated by the set of indexes index_fixed:

$$y_j^m = \begin{cases} y_j & \text{if } j \notin \text{index\_fixed} \\ y_j/z_i^m & \text{if } j = \text{index\_fixed}(i) \end{cases}$$

It has to be noted here that the altering sequence z has fp elements. When the altering sequence z has less than fp elements, only a subset of length(z) points having within the received modulated altered sequence y the same rank as the altered elements within the sequence of modulated altered symbols x', and thus the same rank as those fixed points within the modulated base sequence x which were effectively altered by the source, is corrected.

At next step S902, the received modulated corrected sequence $y'''$ is decoded in order to estimate the p transmitted base bits corresponding to the modulated base sequence under the assumption of the transmission of the $p_3$ supplementary bits associated to the altering sequence $z'''$.

For that, the processor 600 commands the wireless interface 405 in order to decode the received modulated corrected sequence $y'''$, and to associate a cost function to the decoding.

It has to be noted here that a cost function may be also named a figure of merit or a confidence level or an utility function or a reliability function.

This can be done by example by computing, for each possible codeword $d^n$ out of the set of base codewords a cost function per codeword $\Gamma_n^m\, y^m$.

It is then decided, under the assumption of the transmission of the $p_3$ supplementary bits associated to the altering sequence zm, that the set of p base bits transmitted corresponds to the codeword $d^{n(m)}$ and thus to the transmission of the modulated sequence $x^{n(m)}$ where $$n(m) = \underset{n}{\operatorname{argmax}} \Gamma_n^m.$$

The conditional cost function associated to the detection is $$\Gamma^m = \max_n \Gamma_n^m = \Gamma_{n(m)}^m$$

under the assumption of the transmission of the $p_3$ supplementary bits associated to the altering sequence zm.

The conditional cost function per codeword $\Gamma_n^m\, y^m$ can be computed in many ways, for example it can be the conditional probability $\Gamma_n^m\, y^m$=probability $y^m|x^n$ or an approximation of this function or other type of appropriate cost function.

At next step S903, the processor 600 memorises in RAM memory 603 information representative of the p detected base bits and of the associated conditional cost function $\Gamma^m$ under the assumption that the modulated altering sequence used by the source Srct is the selected modulated altering sequence $z^m$.

At next step S904, the processor 600 checks if each possible modulated altering sequence has been selected.

If each possible modulated altering sequence has been selected, the processor 600 moves to step S906. Otherwise, the processor 600 moves to step S905, selects another modulated altering sequence, for example by incrementing m by one and returns to step S901.

At next step S906, the processor 600 selects among the memorized conditional cost function values, the one which has the highest value.

At next step S907, the processor 600 selects the altering sequence for which the conditional cost function has the highest value as the one used by the source Srct.

At next step S908, the processor 600 selects the base bits as the ones memorized at step S903 as being associated to the conditional cost function having the highest value as determined at step S906.

FIG. 10 discloses an example of an algorithm executed by the receiver according to a second mode of realization of the present invention.

The present algorithm:
- obtains temporary values from the at least a part of the values of the received modulated altered sequence at positions corresponding to fixed points of the modulated base sequence and from values of those corresponding fixed points of the modulated base sequence,
- determines the supplementary bits from the temporary values,
- obtains new values from the modulated altering sequence corresponding to the determined supplementary bits and from the at least a part of the values of the received modulated altered sequence at positions corresponding to fixed points,
- determines the base bits from the new values and other values of the received modulated altered sequence.

More precisely, the present algorithm is executed by the processor 600 of the receiver Rec.

At step S1000, the processor 600 identifies, among the elements of the received modulated altered sequence y, the set y' of elements corresponding to the reception of those transmitted elements having been altered at by the source Srct.

The elements of y forming y' have been transferred onto subcarriers of indexes given in FIG. 3.

The elements of y forming y' have thus within the received modulated altered sequence y the same rank as the altered elements within the sequence of modulated altered symbols x', and thus the same rank as those fixed points within the modulated base sequence x which were effectively altered by the source Srct.

More precisely, in the present example, since all the fixed points of the modulated base sequence x were altered, the set y' of elements corresponding to the reception of those transmitted elements altered by the source Srct have the ranks listed in FIG. 3 and are thus obtained from the received modulated altered sequence y as:

$$y_i' = y_{\text{index\_fixed}(i)}, i=1\ldots fp.$$

y' regroups the received version of the elements obtained at the source Srct by altering with the modulated altering sequence z the sequence of fixed points Values_fixed given in FIG. 2.

When only a part of the fixed points of the modulated base sequence x is altered by the source, y' regroups the received version of the elements having the same position as those fixed points of the base sequence x that were altered at the source Srct with the modulated altering sequence z.

At next step S1001, the processor 600 commands the wireless interface 405 in order to obtain the received version z' of the modulated altering sequence z from the set y' of elements corresponding to the reception of elements that are altered by the source Srct.

In order to do so, the wireless interface 405 removes from y' the effect of the original values of those fixed points that were effectively altered by the source Srct. For example, when altering is made by multiplication, the received modulated altering sequence z' may be obtained by dividing the elements of the set y' of elements corresponding to the reception of elements that are altered by the source Srct by the original value of the altered fixed points.

In the present example, since all the fp fixed points were altered, the wireless interface 405 removed the effects of Values_fixed:

$$z_i' = y_i'/\text{Values\_fixed}(i), i=1\ldots fp$$

At next step S1002, the processor 600 commands the wireless interface 405 in order to decode the received altering sequence and thus to estimate the $p_3$ supplementary bits of information.

Decoding of the received altering sequence z' in order to estimate the $p_3$ supplementary bits can be done by any appropriate means.

This can be done for example by computing, for each possible modulated altering sequence zm among the set $z^1$ to $z^{2^{p_3}}$ modulated altering sequences that could be used by the source Srct for altering the fixed points of the modulated base sequence x, a cost function $\Gamma_{3,m}$, z' depending on the received modulated altering sequence z' and of the assumed modulated altering sequence $z^m$.

Classically, this function is proportional to the probability of having transmitted $z^m$ knowing that z' was received. The set of $p_3$ supplementary bits transmitted corresponds to the altering sequence $z^{m_{max}}$ where $$m_{max} = \underset{m}{\text{argmax}} \Gamma_{3,m}(z')$$

The cost function $\Gamma_{3,m}$ z' can be computed in many ways, for example it can be given by the conditional probability $\Gamma_{3,m}$ z'=probability(z'|$z^m$) or other type of appropriate cost function. This probability can for example be evaluated after differential demodulation in systems where differential modulation is employed.

The decoded altering sequence representative of information of the $p_3$ supplementary bits is the one having the highest conditional probability.

At next step S1003, the processor 600 removes the effect of the estimated altering sequence $z^{m_{max}}$ from the received modulated altered sequence y.

In the present example, the altering sequence has fp elements.

$$y_j^{m_{max}} = \begin{cases} y_j & \text{if } j \notin \text{index\_fixed} \\ y_j/z_i^{m_{max}} & \text{if } j = \text{index\_fixed}(i) \end{cases}$$

Where $z^{m_{max}}$ is the decoded altering sequence.

When the altering sequence z has less than fp elements, only a subset of length(z) points having within the received modulated altered sequence y the same rank as the altered elements within the sequence of modulated altered symbols x', and thus the same rank as those fixed points within the modulated base sequence x which were effectively altered by the source, is corrected.

At next step S1004, the processor 600 commands the wireless interface 405 in order to decode the sequence of received modulated corrected symbols $y^{m_{max}}$. Since the effect of the altering was removed $y^{m_{max}}$ contains information representative of the p base bits and can be decoded as in the case of the transmission of a classical P1 symbol.

Figure 11:
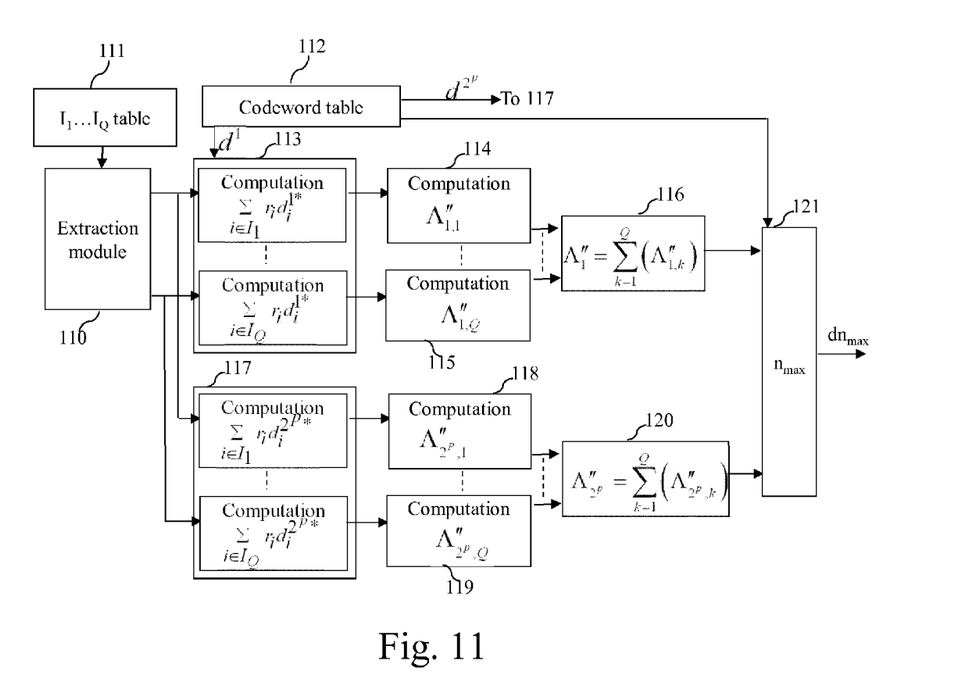
FIG. 11 discloses a block diagram of components of the decoder module of the wireless interface of the receiver according to a particular mode of realization of the present invention.

FIG. 11 discloses a block diagram of components of the decoding module of the wireless interface of the receiver according to a particular mode of realization of the present invention.

The particular mode of realization is executed instead of what has been disclosed at step S902 of FIG. 9 or at step S1002 and/or 1004 of FIG. 10.

In the following the particular mode of realization will be disclosed when it is executed instead of step S902.

We assume that differential modulation is always used at the source Srct, both for obtaining the modulated base sequence x from the codeword d of a set of base codewords, and for obtaining the modulated altering sequence z from the codeword d' out of a set of supplementary codewords. The present invention is depicted in the case where z has a length of fp points and altering is done by multiplication.

The particular mode of realization efficiently corrects phase ramp errors or phase errors that can be approximated by a phase ramp that can occur on the sequence of differentially modulated received symbols which may occur for example due to a timing offset introduced by imperfect timing synchronization at the receiver Rec.

As already disclosed, the wireless interface 605 of the receiver Rec comprises a decoding module 704 which decodes the output of the demapping and unscrambling module 703.

As it has been already mentioned, the time/frequency synchronization module 700 is imperfect and a timing offset of TO samples is introduced.

TO is either positive or negative.

After DFT and subcarrier demapping onto the i-th useful subcarrier of index $k_i$, where $k_i$ are not necessarily consecutive or equidistantly distributed, the signal at the output of the sub-carrier demapping and unscrambling module 703 can be expressed as follows:

$$y_i = h_i x_i' \exp\underbrace{\left(-j 2\pi TO/N \cdot k_i\right)}_{\varphi} + \eta_i, \ i = 0 \ldots M-1$$

Where $h_i$ is the channel transfer function corresponding to the i-th useful carrier and $\eta_i$ is the noise experienced onto that subcarrier, of variance $\sigma^2$, $y_i$ are the elements of the received modulated and altered symbols and $x_i'$ are the elements of the modulated altered sequence.

The sequence y is decoded by the decoder 704 following the procedure described, for example, in FIG. 9.

At step S900, the decoder 704 selects a modulated altering sequence zm among the set $z^1$ to $z^{2^{p_3}}$ modulated altering sequences and at step S901 the decoder 704 removes the effect of this altering sequence to obtain a sequence of received modulated corrected symbols $y^m$ which, under assumption that the modulated altering sequence $z^m$ has been used, has the elements:

$$y_i^m = h_i x_i' \exp\underbrace{\left(-j 2\pi TO/N \cdot k_i\right)}_{\varphi} + \eta_i, \ i = 0 \ldots M-1$$

The signal at the output of the differential demodulation module 704, under the assumption that the modulated altering sequence $z^m$ has been used, can be expressed as follows:

$$r_i^m = \underbrace{y_i^m y_{i-1}^{m*} = h_i h_{i-1}^* x_i x_{i-1}^* \exp(-j\varphi(k_i - k_{i-1})) + n_i}_{\alpha_1} = h_i h_{i-1}^* d_i \exp(-j\alpha_i \varphi) + n_i,$$

$$i = 1 \ldots M-1$$

Where $n_i$ is an equivalent noise $n_i = \eta_{i-1}^* \eta_i + h_i x_i \eta_{i-1}^* + h_{i-1}^* x_{i-1} \eta_i$ of variance $\mu_i^2 = \sigma^4 + \sigma^2(\rho_{i-1}^2 + \rho_i^2)$, $\rho_i = |h_i|$. $\rho_i = |h_i|$.

In the equation here-above the initial element $d_0 = 1$ of each codeword d is ignored. We consider, as in the general case, that the codewords d before differential modulation and the differentially demodulated sequences r after differential demodulation have M−1 useful elements numbered from 1 to M−1. If there was a need of also considering the element $d_0 = 1$ and thus have codewords d having M elements, a dummy value $r_0$ must be inserted. The codewords d before differential modulation and the differentially demodulated sequences r after differential demodulation must have the same number of elements, each element $r_i$ being the received version of the element $d_i$ having within the codeword d the same rank as its received version $r_i$ within the sequence of differentially demodulated symbols r.

A timing offset introduces a phase error that can be approximated by a phase ramp onto the demodulated signal. The phase rotation suffered by any demodulated symbol depends on the timing offset TO and on the distance $\alpha_1$ between the subcarriers carrying the differentially modulated symbols allowing the estimation of the current demodulated symbol. $\alpha_i$ is an element of a vector a which comprises the different distances between subcarriers on which two consecutive differentially modulated symbols are mapped. Distance is understood as the difference of the corresponding subcarrier indexes.

According to the invention, the decoder module 705 is arranged for correcting the phase ramp.

A criterion derived from the log likelihood ratio criterion is applied. This means to maximize the global cost function $$\Lambda^m = \max_{\varphi, d} \log P(r^m | \varphi, d).$$

For each codeword $d^n$ the decoding module 705 finds an estimate phase $\hat{\varphi}^n$ which achieves $$\Lambda_n^m = \max_{\varphi} \log P(r^m | \varphi, d^n) = \log P(r^m | \hat{\varphi}^n, d^n).$$

In the particular case of the DVB standard and P1 symbol, $d^n$ is the n-th codeword out of a set of one hundred twenty eight codewords used to encode the p=7 bits of information contained in the S field.

Decoding is performed by finding $\hat{d}^m = d^{n_{max}(m)}$ where $n_{max}(m)$ is the index ensuring $$\Lambda^m = \Lambda_{n_{max}(m)}^m = \max_n \Lambda_n^m = \max_n \log P(r^m | \hat{\varphi}^n, d^n).$$

Maximizing the cost function per codeword $\Lambda_n^m$ is equivalent to maximizing $$\Lambda_n^m = \sum_{i=1}^{M-1} \frac{\rho_i \rho_{i-1}}{\mu_i^2} \operatorname{Re} r_i^m d_i^{n*} \exp -j\alpha_i \varphi$$

As the telecommunication network employs differential modulation where no channel estimation is performed, the term $$\frac{\rho_i \rho_{i-1}}{\mu_i^2}$$

is ignored in the maximization. Then:

$$\Lambda_n'^m = \sum_{i=1}^{M-1} \operatorname{Re} r_i^m d_i^{n*} \exp -j\alpha_i \varphi$$

According to a particular mode of realization, when the elements $\alpha_i$ of $\alpha$ take Q different values denoted $A_k, k=1 \ldots Q$, the present invention forms Q groups of differentially demodulated symbols and processes each group separately.

The above mentioned equation can be rewritten as a sum of partial cost functions per codeword, each partial cost function corresponding to the modulation symbols associated to a given subcarrier distance:

$$\Lambda_n'^m = \sum_{k=1}^{Q} \left( \sum_{i \in I_k} \operatorname{Re} r_i^m d_i^{n*} \exp -jA_k \varphi \right)$$

$$\Lambda_n'^m = \sum_{k=1}^{Q} \left( \operatorname{Re} \left( \exp -jA_k \varphi \sum_{i \in I_k} r_i^m d_i^{n*} \right) \right) = \sum_{k=1}^{Q} \Lambda_{n,k}'^m(\varphi)$$

For example, the partial cost function $$\Lambda_{n,k=3}'^m(\varphi) = \operatorname{Re} \left( \exp -jA_{k=3} \varphi \sum_{i \in I_3} r_i^m d_i^{n*} \right)$$

corresponds to those modulation symbols $d_i^n$, $i \in I_3$ composing the n-th codeword $d^n$ and to the corresponding received differentially demodulated symbols $r_i^m$ that can be retrieved from received differentially modulated symbols $y_{i-1}^m$, $y_i^m$, mapped onto the i-th and i+1th out of three hundred eighty for active subcarriers of index $k_{i-1}$ and $k_i$, within the set of eight hundred fifty three useful subcarriers distanced by k=3 steps. Superscripts m indicate the assumption that the modulated altering sequence $z^m$ has been used.

The set of indexes i of the identified differentially demodulated symbols $r_i$ in the k-th group is denoted by $I_k$.

A separate maximization of each partial cost function is performed. We can simplify the above mentioned equation as follows:

$$\Lambda_n'^m = \sum_{k=1}^{Q} \Lambda_{n,k}'^m(\varphi_k^m)$$

We have thus to find $$\varphi_k^m = \operatorname*{argmax}_\varphi \Lambda_{n,k}^{\prime\prime\prime m} = \operatorname*{argmax}_\varphi \left( \operatorname{Re}\left( \exp - jA_k^\varphi \sum_{i \in I_k} r_i^m d_i^{n*} \right) \right)$$

$$\varphi_k^m = \frac{1}{A_k} \arctan \frac{\operatorname{Im}\left( \sum_{i \in I_k} r_i^m d_i^{n*} \right)}{\operatorname{Re}\left( \sum_{i \in I_k} r_i^m d_i^{n*} \right)}$$

With this value, $\Lambda''{}_{n,k}{}^m$ reduces to:

$$\Lambda_{n,k}^{\prime\prime\prime m} = \left| \sum_{i \in I_k} r_i^m d_i^{n*} \right|.$$

The decoding module 705 jointly decodes the transmitted symbols noted d and corrects according to the particular mode of realization of the present invention a phase ramp.

The decoder 705 comprises an extraction module 110 which forms Q groups of differentially demodulated symbols using a table 111 which enables the extraction module 110 to identify the differentially demodulated symbols obtained from received symbols transferred onto active subcarriers distanced by a given distance.

In FIG. 11 and in the following description superscripts m are omitted for generality reasons.

When the particular mode of realization is executed instead of what has been disclosed at step S902 of FIG. 9, $r_i$ should be replaced by $r_i^m$ in the following.

When particular mode of realization is executed instead of what has been disclosed at step S1004 of FIG. 10, $r_i$ should be replaced by $y_i^{m_{max}*} y_{i-1}^{m_{max}}$.

When the particular mode of realization is executed instead of what has been disclosed at step S1002 of FIG. 10, $r_i$ should be understood as the differentially demodulated version of the received modulated altering sequence, $r_i = z_i'^* z_{i-1}'$, and the set of base codewords d should be replaced by the set of supplementary codewords d', and consequently the p base bits should be replaced by the $p_3$ supplementary bits. Also, in this particular case, in the following the notion of active subcarrier and all the subcarrier distances, indexes and tables of indexes should be understood with respect only to the subcarriers carrying altered symbols.

The extraction module 110 identifies Q groups of differentially demodulated symbols $r_i$, each k-th group having $q_k$ differentially demodulated symbols, each such differentially demodulated symbol $r_i$ being obtained by combining received symbols $y_i$, $y_{i-1}$ transferred onto subcarriers identified by indexes $k_i$, $k_{i-1}$ in the space of useful subcarriers distanced by a fixed distance $A_k = k_i - k_{i-1}$.

The decoder 704 comprises $2^p$ preliminary sum computation modules. Only two preliminary sum computation modules 113 and 117 are shown in FIG. 11 for the sake of clarity.

The preliminary sum computation module 113 calculates the sums $$\sum_{i \in I_1} r_i d_i^{1*}, \sum_{i \in I_2} r_i d_i^{1*}, \sum_{i \in I_3} r_i d_i^{1*}, \sum_{i \in I_4} r_i d_i^{1*} \text{ and } \sum_{i \in I_5} r_i d_i^{1*}$$

using the codeword $d^1$ provided by a code word table 112.

The preliminary sum computation module 117 calculates the sums $$\sum_{i \in I_1} r_i d_i^{2p*}, \sum_{i \in I_2} r_i d_i^{2p*}, \sum_{i \in I_3} r_i d_i^{2p*}, \sum_{i \in I_4} r_i d_i^{2p*} \text{ and } \sum_{i \in I_5} r_i d_i^{2p*}$$

using the codeword $d^{2^p}$ provided by the code word table 122.

Each preliminary sum computation module 113, 117 provides Q respective sums to Q partial cost function modules.

Only four partial cost function modules are shown in FIG. 11 for the sake of clarity.

The preliminary sum computation module 113 provides the first sum $$\sum_{i \in I_1} r_i d_i^{1*}$$

to the partial cost function module 114 which calculates the partial cost function $$\Lambda_{1,1}'' = \left| \sum_{i \in I_1} r_i d_i^{1*} \right|.$$

The preliminary sum computation module 113 provides the Qth sum $$\sum_{i \in I_Q} r_i d_i^{1*}$$

to the partial cost function module 115 which calculates the partial cost function $$\Lambda_{1,Q}'' = \left| \sum_{i \in I_Q} r_i d_i^{1*} \right|.$$

The preliminary sum computation module 117 provides the first sum $$\sum_{i \in I_1} r_i d_i^{2p*}$$

to the partial cost function module 118 which calculates the partial cost function $$\Lambda_{2^p,Q}'' = \left| \sum_{i \in I_1} r_i d_i^{2p*} \right|.$$

The preliminary sum computation module 117 provides the Qth sum $$\sum_{i \in I_Q} r_i d_i^{2p*}$$

to the partial cost function module 119 which calculates the partial cost function $$\Lambda''_{2P,Q} = \left| \sum_{i \in I_Q} r_i d_i^{2P*} \right|.$$

For each k-th group of the Q groups of differentially demodulated symbols already identified, a partial cost function is then calculated. This partial cost function implicitly contains sub-optimal timing offset compensation, since the estimated common phase shift $A_k \phi_k$ is locally compensated for this group.

The partial cost function modules 114 and 115 provide the calculated partial cost functions to a cost function per codeword calculation module 116 which calculates $$\Lambda''_1 = \sum_{k=1}^{Q} \Lambda''_{1,k}.$$

The partial cost function modules 118 and 119 provide the calculated partial cost functions to a cost function per codeword calculation module 120 which calculates $$\Lambda''_{2P} = \sum_{k=1}^{Q} \Lambda''_{2P,k}.$$

Each partial cost function is fed into a maximization module 121 which decides that codeword $d^{n_{max}}$ was transmitted by choosing $$n_{max} = \underset{n}{\operatorname{argmax}} \Lambda''_n.$$

Naturally, many modifications can be made to the embodiments of the invention described above without departing from the scope of the present invention.

The invention claimed is:

1. A method for increasing the amount of information bits comprised in a symbol transferred by a source to at least one receiver, wherein the symbol is representative of a modulated base sequence obtained by encoding a sequence of base bits selected by the source among a plurality of possible sequences of base bits and by modulating the encoded selected sequence, each of the possible modulated base sequences that can be obtained from the possible sequences of base bits having fixed points, a fixed point having a same predetermined position within each modulated base sequence and having the same value within each modulated base sequence, the method comprising:
encoding the selected sequence of base bits using an error correction code;
encoding a sequence of supplementary bits using an error correcting code;
obtaining a modulated base sequence by modulating the encoded selected sequence of base bits;
obtaining a modulated altering sequence by modulating the sequence of supplementary bits, the modulated altering sequence having a length inferior or equal to the number of fixed points of the modulated base sequence;
altering the modulated base sequence by modifying at least a part of the values of its fixed points using the modulated altering sequence in order to obtain a modulated altered sequence; and
transferring the modulated altered sequence under the form of an altered symbol.

2. The method according to claim 1, wherein the modulation is a differential modulation.

3. The method according to claim 1, further comprising:
prior to the transferring the altered symbol, scrambling the modulated altered sequence.

4. The method according to claim 2, wherein the altered symbol is an Orthogonal frequency Division Multiplexing symbol and in that the modulated altered sequence is transferred onto the subcarriers of the Orthogonal frequency Division Multiplexing altered symbol.

5. The method according to claim 4, wherein the altered symbol is a synchronization symbol.

6. The method according to claim 2, wherein the altered symbol is a Time Division Multiplex symbol or frame and in that the modulated altered sequence is transferred onto timeslots of a Time Division Multiplex transmission scheme.

7. The method according to claim 1, wherein the modulated base sequence is altered by multiplying at least a part of the values of its fixed points by the elements of the modulated altering sequence.

8. A non-transitory computer readable medium including a computer program which can be directly loadable into a programmable device, comprising instructions or portions of code for implementing the method according to claim 1 when said computer program is executed on a programmable device.

9. A method for retrieving a sequence of base bits and a sequence of supplementary bits, wherein the sequence of supplementary bits is used to alter a modulated base sequence in order to form an altered symbol transferred by a source, the modulated base sequence being obtained by encoding a sequence of base bits selected by the source among a plurality of possible sequences of base bits and by modulating the encoded selected sequence of base bits, each modulated base sequence of the plurality of possible modulated base sequences that can be obtained from the possible sequences of base bits having fixed points, a fixed point having a same predetermined position within each modulated base sequence and having the same value within each modulated base sequence, the method comprising:
receiving the altered symbol and retrieving a received modulated altered sequence;
processing at least a part of the values of the received modulated altered sequence at positions corresponding to fixed points of the modulated base sequence in order to obtain new values; and
determining, at least from the new values, the sequence of base bits and the sequence of supplementary bits.

10. The method according to claim 9, wherein for each possible modulated altering sequence:
new values are obtained from the modulated altering sequence and from the at least a part of the values of the received modulated altered sequence at positions corresponding to fixed points,
an associated cost function value and an associated sequence of base bits are determined from the new values and other values of the received modulated altered sequence, and the sequence of base bits and the supplementary sequence are determined by selecting the sequence of base bits and the sequence of supplementary bits which are associated to the maximum determined cost function value.

11. The method according to claim 9, wherein:

temporary values are obtained from the at least a part of the values of the received modulated altered sequence at positions corresponding to fixed points of the modulated base sequence and from values of those corresponding fixed points of the modulated base sequence, the sequence of supplementary bits is determined from the temporary values, new values are obtained from the modulated altering sequence corresponding to the determined supplementary bits and from the at least a part of the values of the received modulated altered sequence at positions corresponding to fixed points of the modulated base sequence, and the base bits are determined from the new values and other values of the received modulated altered sequence.

12. A non-transitory computer readable medium including a computer program which can be directly loadable into a programmable device, comprising instructions or portions of code for implementing the method according to claim 9 when said computer program is executed on a programmable device.

13. A device for increasing the amount of information bits comprised in a symbol transferred by a source to at least one receiver, wherein the symbol is representative of a modulated base sequence obtained by encoding a sequence of base bits selected by the source among a plurality of possible sequences of base bits and by modulating the encoded selected sequence, each of the possible modulated base sequences that can be obtained from the possible sequences of base bits having fixed points, a fixed point having a same predetermined position within each modulated base sequence and having the same value within each modulated base sequence, the device comprising:

means for encoding the selected sequence of base bits using an error correction code;

means for encoding a sequence of supplementary bits using an error correcting code;

means for obtaining a modulated base sequence by modulating the encoded selected sequence of base bits;

means for obtaining a modulated altering sequence by modulating the sequence of supplementary bits, the modulated altering sequence having a length inferior or equal to the number of fixed points of the modulated base sequence;

means for altering the modulated base sequence by modifying at least a part of the values of its fixed points using the modulated altering sequence in order to obtain a modulated altered sequence; and means for transferring the modulated altered sequence under the form of an altered symbol.

14. A device for retrieving a sequence of base bits and a sequence of supplementary bits, wherein the sequence of supplementary bits is used to alter a modulated base sequence in order to form an altered symbol transferred by a source, the modulated base sequence being obtained by encoding a sequence of base bits selected by the source among a plurality of possible sequences of base bits and by modulating the encoded selected sequence of base bits, each modulated base sequence of the plurality of possible modulated base sequences that can be obtained from the possible sequences of base bits having fixed points, a fixed point having a same predetermined position within each modulated base sequence and having the same value within each modulated base sequence, the device comprising:

means for receiving the altered symbol and retrieving a received modulated altered sequence;

means for processing at least a part of the values of the received modulated altered sequence at positions corresponding to fixed points of the modulated base sequence in order to obtain new values; and means for determining, at least from the new values, the sequence of base bits and the sequence of supplementary bits.

* * * * *